Aug. 6, 1935.  C. W. MÜLLER  2,010,196
WRAPPING MECHANISM
Filed Sept. 21, 1931   3 Sheets-Sheet 2

Inventor:
C. W. Müller
by E. F. Wendroth
Atty

Aug. 6, 1935.  C. W. MÜLLER  2,010,196
WRAPPING MECHANISM
Filed Sept. 21, 1931   3 Sheets-Sheet 3
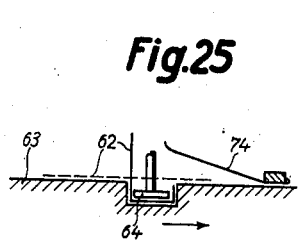
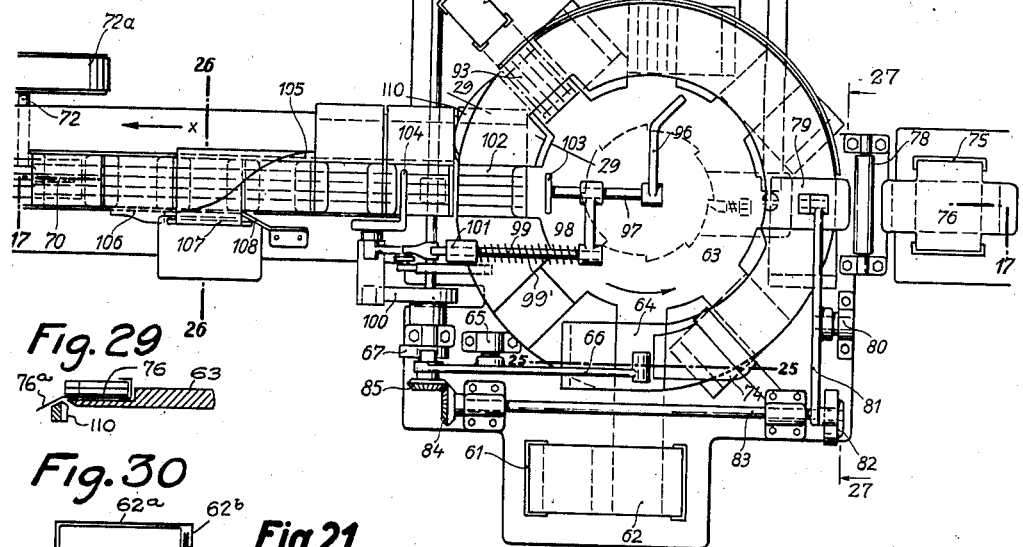
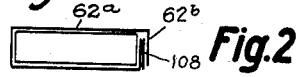
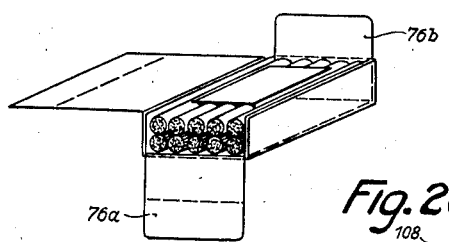
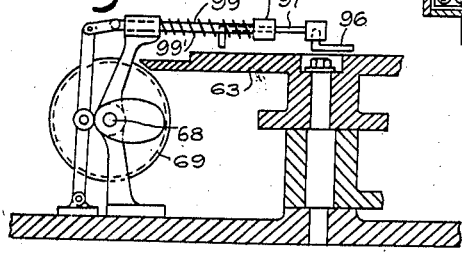
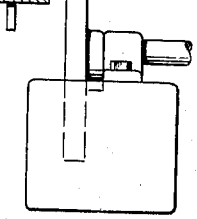
Inventor:
C. W. Müller Patented Aug. 6, 1935

2,010,196

UNITED STATES PATENT OFFICE 2,010,196

WRAPPING MECHANISM

Carl Wilhelm Müller, Dresden-Weisser Hirsch, Germany

Application September 21, 1931, Serial No. 564,135
In Germany November 8, 1930

19 Claims. (Cl. 93—2)

In the case of the filling of so-called drawer and shell boxes which consist of an outer shell (called a sheath) and a drawer for receiving the goods, in a packeting machine, ready made shells (or sheaths) have hitherto always been used for this purpose. The manufacture is carried out in tubular form, so that the individual shells separated from the continuous tube must still be erected for use, which involves troublesome constructional operations, particularly in the case of broad drawer and shell boxes which are well-known to withstand being placed upright.

According to the present invention, however, the shell is formed on a core in the packeting machine itself from a blank fed thereto, which core may be the filled drawer portion.

In this manner it is possible, whilst eliminating shells separated from a tube and prepared previously, to form the shells in the packeting machine itself, namely by placing them directly around the already filled drawer part, and the drawer part nay even be formed with the shell part, so that two blanks are introduced into the packeting machine, one for the drawer part and another for the shell part, and the packing of the articles may be effected simultaneously with the manufacture of the package.

It must be pointed out here that methods are known in the manufacture of drawer and shell boxes of making the shell part by means of a shaping core, the finished shell parts being stacked and subsequently fitted to the drawer part by hand or by a machine.

The blank of the drawer part carrying the goods to be packed is preferably thrust on to the bottom of the shell already provided with erect side walls by introduction into a channel or the like, then the drawer part is completely folded and thereupon the other flaps of the shell part are placed around the drawer part filled with the goods.

Now in order to give the whole a firm hold during the folding process when the shaping core consists of the filled drawer part, that is to say still has great powers of resistance, it is advisable when shaping the shell over the drawer part, to insert between the two, thin flat ribs or the like which serve as a stiffening frame when shaping and by which, after the shaping is finished, the shaping members are removed, or from which the finished articles are withdrawn.

In order to explain the invention more fully, two forms of construction are illustrated in the annexed drawings.

The form of construction shown in Figs. 1–15 relates to a packeting machine in which a solid shaping core is used.

The form of construction shown in Figs. 16–26 shows a shaping core which is formed by the filled drawer part itself.

Fig. 8 shows the finished drawer and shell box.

Figure 16 is a plan view of another modification,

Figure 17 is a side view in section taken upon the line 17—17 of Figure 16,

Figures 18 to 24 show the shell or casing and the drawer part of the box after certain processes have been completed thereon, Figure 25 is a detailed sectional view upon line 25—25 of Figure 16, Figure 26 is a detailed sectional view upon the line 26—26 of Figure 16, Figure 27 is a detailed side elevational view taken upon the line 27—27 looking in the direction of the arrows upon Figure 16, Figure 28 is a detailed vertical sectional view showing the construction of a folding member.

Figure 29 is a detailed sectional view taken upon the line 29—29 of Figure 16, and Figure 30 is a detailed view in cross section showing the functioning of a folding bar.

Figure 1:
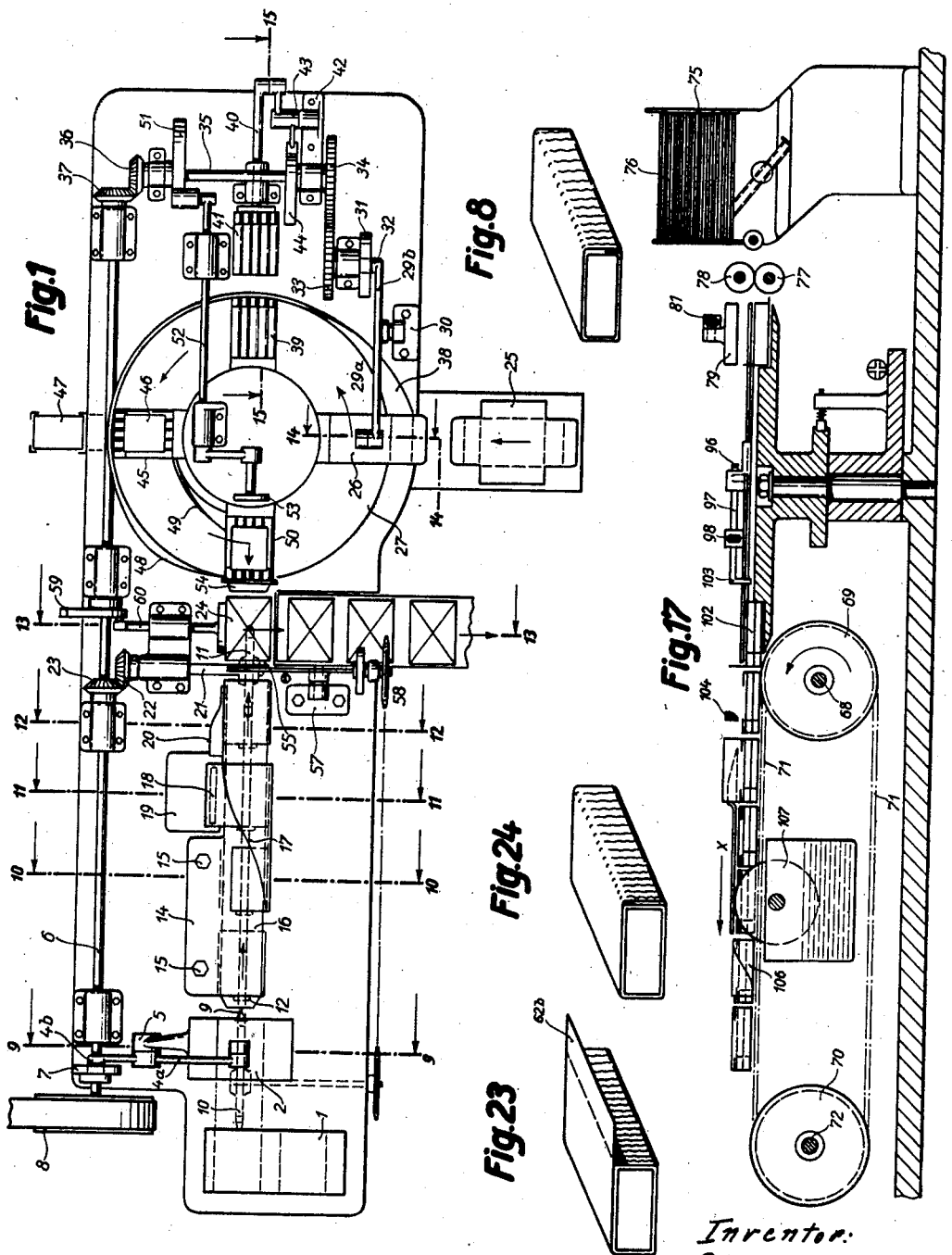
Fig. 1 is a plan of the whole machine.
Figure 2:
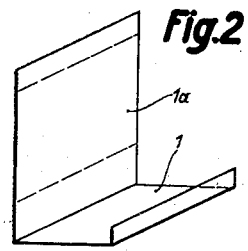
Figs. 2, 3 and 4 show the shell (or sheath) in various stages of the folding operation.
Figure 3:
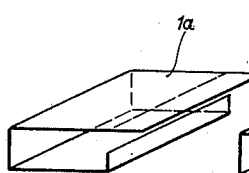
Figure 4:
Figure 9:
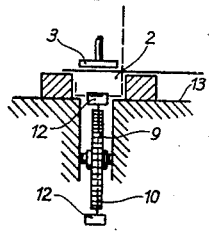
Fig. 9 is a section along the line 9—9 of Fig. 1.
Figure 10:
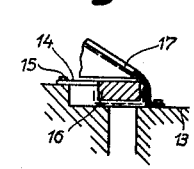
Fig. 10 is a section along the line 10—10 of Fig. 1.
Figure 11:
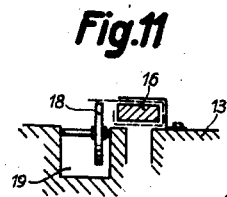
Fig. 11 is a section along the line 11—11 of Fig. 1.
Figure 12:
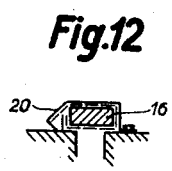
Fig. 12 is a section along the line 12—12 of Fig. 1.

The finished blank 1 of the shell is placed above a channel 2 by any desired feeding means and pressed into it by the pressure block 3, so that the blank is folded as shown in Figs. 2 and 9. The block 3 is mounted on an arm 4ᵃ of a two-armed lever pivoted on the bearing 5, the second arm 4ᵇ of this lever being actuated by the cam 7 mounted on the main shaft 6. On the shaft 6 is mounted the belt pulley 8 which is connected with the driving motor by a belt. Under the channel 2 runs a chain 9 intermittently operated by any desired means which passes over the sprockets 10 and 11, and is provided with pushers 12 which pass through a recess in the base of the channel, and remove the folded shells. The latter slide over the table surface 13, and a core 16, held fast to the frame of the machine by an arm 14 and the screws 15, is thrust into each shell and folded in the manner indicated in Fig. 3 (Fig. 10). On the further forward movement of each shell 1 the erect longer side 1a comes into contact with a folding member 17 fixed to the machine frame, which folds the side 1a over the core 16, whereupon the shell assumes the form shown in Fig. 3. Thus the edge of the side 1a comes into position over a roller 18 which dips into an adhesive container 19 and applies adhesive to the projecting edge of the side 1a (Fig. 11). Finally, a second folding member 20 folds the last side of the shell 1 and attaches it as shown in Fig. 4 (see Fig. 12). The chain 9 driven by the sprocket 11, the shaft 21, and the bevel pinions 22, 23, by the main shaft 6, brings the finished shell into the position 24, where it receives the drawer part with the cigarettes, as described more fully below.

Figure 5:
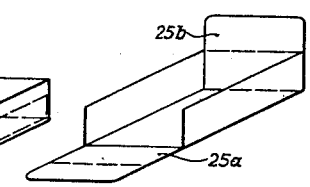
Figs. 5, 6 and 7 show the drawer portion in various stages during the folding operation.
Figure 14:
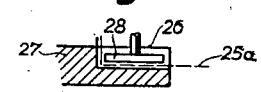
Fig. 14 is a section along the line 14—14 of Fig. 1.

The blanks 25 for the drawer part are brought over the channel 26 in a rotating disc 27 and are pressed therein by the pressure block 28, so that they assume the form shown in Fig. 5 (Fig. 14). The block 28 is mounted on a lever-arm 29a of a two-armed lever pivoted at 30, the other end 29b being actuated by a cam 31. The latter is mounted on a shaft 32 which is driven by means of the gear wheels 33, 34 of the shaft 35 and the bevel pinions 36, 37 by the main shaft 6.

Figure 6:
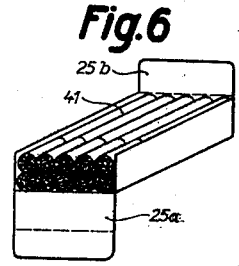
Figure 15:
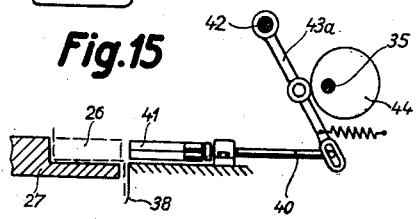
Fig. 15 is a section along the line 15—15 of Fig. 1.
Figure 13:
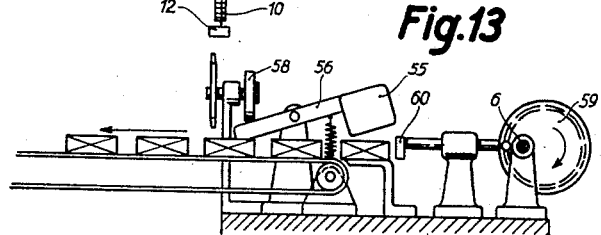
Fig. 13 is a section along the line 13—13 of Fig. 1.

When the block 28 is again raised the disc 27 is turned through an angle of 90°, whereupon the side 25a of the blank which projects radially from the shell is pressed downwards by the folding members 38, so that in the new position 39 the cigarettes 41 introduced by the ram 40 can be forced in. The drawer part with the cigarettes is then as shown in Fig. 6. The ram 40 is actuated by the double-armed levers 43a, 43b which are pivoted at 42, by means of the cam 44 mounted on the shaft 35 (Fig. 15).

Figure 7:
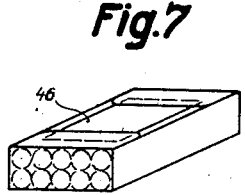

After a further quarter revolution of the disc 27, the drawer part filled with cigarettes comes into the position 45 where wrapping sheets 46 removed from a magazine 47 are placed on the cigarettes. During the third quarter revolution the downwardly hanging sides 25a of the drawer part are raised by the folding member 48 fixed rigidly to the motor frame, and are folded over the cigarettes. At the same time the folding member 49 folds the other erect end 25b of the drawer part, so that in the position 50 the latter which contains the cigarettes is completely closed, as shown in Fig. 7.

The cam 51 mounted on the shaft 35 reciprocates the rod 52 and with it the ram 53. Thus the ram 53 presses the drawer part containing the cigarettes out of the position 50 through the mouthpiece 54 into the shell which is in the position 24. In this operation care must be taken to ensure that the shell remains in its position. Therefore, every time the ram 53 thrusts a drawer part into a shell, a plate 55 is placed behind the shell in such manner that the latter can rest against it. The plate 55 is mounted on a double-armed lever 56 pivoted at 57 which is actuated by the cam 58 mounted on the shaft 21. It is obvious that the plate 55 must assume its uppermost position every time a new shell is moved from the position 24 by the chain 9.

When, therefore, the packing process is finished and the finished drawer and shell box has the shape shown in Fig. 8, the drawer and shell box is thrust out of the machine by the ram 60. The ram 60 is actuated by an eccentric 59 mounted on the shaft 6.

The modification shown in Figures 16 to 30 will now be described.

The blanks 62 for the boxes are removed from the magazine 61 and passed above a channel in the rotating disc 63. Here the pressure block 64 presses the blank into the channel so that the blank assumes the form shown in Fig. 2. In order that the rotating disc 63 should not be too heavy it is recessed between the channels. The ram 64 is actuated by the double-armed lever 66, pivoted at 65, by means of a cam 67. This cam is mounted on the shaft 68 which is driven by the conveyer belt 71 that passes over the wheels 69 and 70. The wheel 70 is mounted on the shaft 72 and is driven by the belt pulley 72a by means of a belt and the driving motor.

Figure 18:
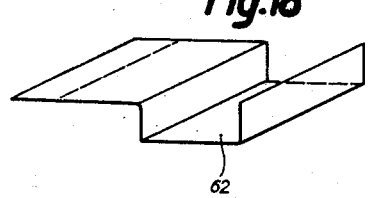

When the blank has been given the form shown in Fig. 2, the disc 63 rotates, whereby the projecting end of the blank is pressed against the disc 63 by the oblique surface 74, so that the blank now assumes the shape shown in Fig. 18 (Fig. 25).

Figure 19:
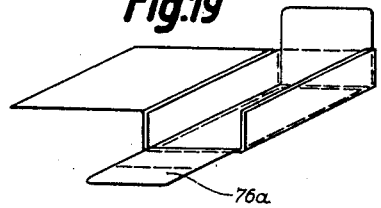

When the disc 63 has completed a quarter revolution, a blank 76 for the drawer part removed from the magazine 75, is passed between the rollers 77, 78 and placed above the channel in which is the shaped blank for the shell, as described above, and is pressed into it (Fig. 17). The relative position of the two blanks and their shape in this position is shown in Fig. 19. The blank is inwardly displaced by means of a ram 79 which is actuated by the double-armed lever 81 pivoted at 80, and by the cam 82. This cam 82 is mounted on the shaft 83, which is driven by the bevel pinions 84, 85 and the shaft 68.

Figure 20:
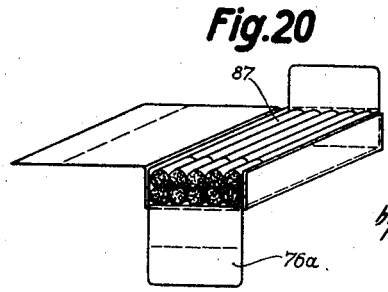

On the further rotation of the disc 63, shown in Figs. 16 and 17, the end 76a of the blank of the drawer part which projects from the disc, is pressed downwards by means of a folding member 109, and, in the position 86, the cigarettes 87 are thrust into the prepared blank by means of the ram 88 (Fig. 20). A spring 88' secured to the ram and the machine frame returns the ram when pushed forward and actuated by the cam 90. The ram 88 is actuated by a cam 90 mounted on the shaft 89. The latter is connected to the shaft 68 by the bevel pinions 91, 92. In the next position 93 wrapping or cover sheets 95 are removed from a magazine 94 and placed on the cigarettes (Fig. 21). Finally, by the next rotation of one eighth of a revolution of the disc 63 the folder 110 raises the downwardly depending end 76a, and the other end 76b of the drawer part which projects upwards is turned down. This is done by means of the rods 96—99, which are moved to and fro by means of the cam 100 mounted on the shaft 68. The rod 99 slides through the guide 101 and the rod 97 through an eye of the rod 98. When the rod is moved towards the left (see Fig. 16), the end of the rod 96 is placed over the end 76b and folds it over the cigarettes. In the position 102 the blanks of the box with its contents appear as shown in Fig. 22. Here on the reciprocating movement of the rods 96—99 they are thrust out of the path of the disc 63 by the ram 103 mounted on the rod 97, whereupon the finger 104 folds the last end of the flap 76a over the cigarettes. The finger 104 is arranged above the conveyor path so that when the punch or ram 103 shoves the cigarette filled slide box out of the rotary disk chamber, the front flaps are turned over by the finger.

Thus the blanks arrive on the conveyer belt 71 which passes them under the folding members 105 and 106 in the direction indicated by the arrow, which as in the form of construction shown in Figs. 1-15 already described, turn the upper part 62ª of the shell, pass it by the adhesive roller 107 and completely fasten it. Before the last side 62ᵇ is turned and pressed by the folding member 106, a stationary thin flat rib 108 contacts this side of the box between the drawer part and the shell and takes the pressure exerted by the folding member 106. On the forward movement of the conveyer belt the finished box is removed from the flat rib, and now appears as shown in Fig. 24.

Having thus described the nature of the said invention and the best means I know of carrying the same into practical effect, I claim:—

1. A wrapping machine comprising a rotatable table, means for intermittently rotating said table, means associated with said table for forming a box from a box blank, means for filling the same with articles to be wrapped, a loading station, means for expelling said box with the articles to said loading station, a stationary table, a channel provided in said stationary table, cover forming means associated with said channel, means for discharging said covers at said loading station and means whereby individual covers are held while the filled boxes are loaded therein.

2. A wrapping machine comprising a stationary table, a channel in said stationary table, means for feeding a cover blank over said channel, means for forming said cover blank into a tube, means for transferring said completed cover to a loading station, a rotary table, means associated with said rotary table for forming a box blank into a completed box, means for filling the same with articles and means for discharging said filled box from said rotary table directly into individual covers held at said loading station.

3. A wrapping machine comprising a stationary table, a channel in said stationary table, means for feeding a cover blank over said channel, means for forming said cover blank into a tube, means for transferring said completed cover to a loading station, a rotary table, means associated with said rotary table for forming a box blank into a completed box, means for filling the same with articles, means for discharging said filled box from said rotary table directly into individual covers held at said loading station and means for discharging said associated covers and boxes from said loading station.

4. A wrapping machine comprising a stationary table having a channel therein, means for feeding cover blanks to a position over said channel, means for depressing said blanks into said channel so as to initially fold the same, a former, means for feeding said initially folded blank along said former so as to complete the formation thereof into a tubular cover and discharge the same at a loading station, a rotary table, means associated with said rotary table for forming a box, means for filling the same with articles to be wrapped, means for discharging said filled box from said rotary table into said cover held at said loading station and means for holding said cover in fixed position during said loading.

5. A wrapping machine comprising a stationary table having a channel therein, means for feeding cover blanks to a position over said channel, means for depressing said blanks into said channel so as to initially fold the same, a former, means for feeding said initially folded blank along said former so as to complete the formation thereof into a tubular cover and discharge the same at a loading station, a rotary table, means associated with said rotary table for forming a box, means for filling the same with articles to be wrapped, means for discharging said filled box from said rotary table into said cover held at said loading station and a pivoted abutment for holding said cover in fixed position during said loading.

6. A wrapping machine comprising a rotatable table having a plurality of radial channels therein, means for intermittently rotating said table so as to bring said channels to rest at various operating stations, means for feeding a cover blank above one of said channels at a feeding station, means for partially folding said cover blank at said feeding station, means for feeding a box blank above said channel at a box blank feeding station, means for partially forming said box blank at said box blank feeding station within said partially folded cover blank, means for filling said partially folded box blank with articles at a filling station, means for completely folding said box blank into a box enclosing said articles and means for completing the folding of said cover blank about said box.

7. A wrapping machine comprising a rotatable table having channels therein, means for intermittently rotating said table so as to bring said channels at rest at various operating stations, means for partially forming a cover blank within one of said channels at one of said operating stations, means for inserting a partially folded box blank within said partially folded cover blank, means for completely folding said box blank into a box and means for thereafter completing the folding of said cover blank about said box.

8. A wrapping machine comprising means for partially folding a cover blank, means for partially folding a box blank within said partially folded cover blank, means for filling said partially folded box blank, means for completing the folding of said box blank and means for completing the folding of said cover blank about said box.

9. A wrapping machine comprising means for partially folding a cover blank, means for completely folding a box blank, means for filling said box blank within said partially folded cover blank and means for completing the folding of said cover blank about said box.

10. A wrapping machine comprising means for partially folding a cover blank, means for folding a box, means for filling the same with articles within said partially folded cover, means for placing a top sheet upon said articles within said box and means for completing the folding of said cover blank about said box.

11. A wrapping machine comprising means for partially folding a cover blank, means for completely folding a box blank, means for filling the same with articles within said partially folded cover blank, supporting rod for protecting said box with the articles therein during the completion of the folding of said cover blank and means for completely closing said cover blank about said box while so protected.

12. A wrapping machine comprising a rotatable table having channels therein, means for intermittently rotating said table so as to bring said channels to rest at various operating stations, means for feeding a cover blank over one of said channels at a feeding station, means for partially folding said cover blank at said feeding station by forcing said blank into said channel, means for feeding a box blank above said partially formed cover, means for partially folding said box blank by forcing the same into said channel with said cover blank, means for filling said partially formed box with articles, means for closing said box completely with the articles therein and means for completely forming said cover about said filled box.

13. A wrapping machine comprising a rotatable table having channels therein, means for intermittently rotating said table so as to bring said channels to rest at various operating stations, means for feeding a cover blank above one of said channels at a feeding station, means for partially forming said cover at said feeding station, means for feeding a box blank above said cover blank at a box blank feeding station, means for partially forming said box within said cover blank, means for filling said partially formed box with articles, means for completing the folding of said box about said articles, means for discharging said completely folded box with said partially folded cover from said rotary table, a stationary table and means upon said stationary table for completing the folding of said cover about said box.

14. A process for packing cigarettes and similar articles comprising forming a partially folded cover, then forming within said partially folded cover a complete box from a blank and then completing the folding of said cover about said box.

15. A process of packing cigarettes or similar articles comprising forming a partially folded cover from a blank, then forming a complete box from another blank within said folded portion of said cover, then filling said box and then finally completing the folding of said cover about said filled box.

16. A wrapping machine comprising a rotatable table, means intermittently rotating said table, a channel in said table, means for forcing a box blank into said channel and partially folding the same, means for filling said partially folded box with articles, means associated with said table for completing the folding of said box blank about said articles and means for folding a cover about said completed folded box blank.

17. A wrapping machine comprising a rotatable table, means intermittently rotating said table, channels in said table, means for feeding a box blank above one of said channels, means for inserting said box blank into said channel in order to partially fold said blank, means for folding one of the sides of the box so as to expose an opening into said partially completed box, means for inserting articles into said partially completed box, means for completing the folding of said box and means folding a cover about said box.

18. A wrapping machine comprising a rotatable table, means intermittently rotating said table, channels in said table, means for feeding a box blank above one of said channels, means for inserting said box blank into said channel so as to fold three sides of the box, means for folding the fourth side of said box blank so as to expose an opening into said partially completed box, means for sliding the articles to be wrapped into said partially completed box, means associated with said table for completing the folding of said box and means for folding a slide about said box.

19. A wrapping machine comprising means for folding a cover about a filled box and said means including a supporting bar extending along a side of the filled box to protect said box when the cover is folded about the same.

CARL WILHELM MULLER.